United States Patent
Villaret

(10) Patent No.: US 8,461,830 B2
(45) Date of Patent: Jun. 11, 2013

(54) APPARATUS AND METHOD FOR MEASURING DISPLACEMENTS OF DISPLACEABLE MEMBERS

(75) Inventor: Yves Villaret, Hadera (IL)

(73) Assignee: Yaskawa Europe Technology Ltd., Rosh HaAyin (IL)

( * ) Notice: Subject to any disclaimer, the term of this patent is extended or adjusted under 35 U.S.C. 154(b) by 327 days.

(21) Appl. No.: 12/676,156

(22) PCT Filed: Sep. 3, 2008

(86) PCT No.: PCT/IL2008/001190
§ 371 (c)(1),
(2), (4) Date: Mar. 3, 2010

(87) PCT Pub. No.: WO2009/031142
PCT Pub. Date: Mar. 12, 2009

(65) Prior Publication Data
US 2010/0253327 A1 Oct. 7, 2010

Related U.S. Application Data

(60) Provisional application No. 60/935,857, filed on Sep. 4, 2007.

(51) Int. Cl.
*G01B 7/30* (2006.01)
(52) U.S. Cl.
USPC .................................................. 324/207.25
(58) Field of Classification Search
USPC ......................................... 324/207.25, 207.2
See application file for complete search history.

(56) References Cited

U.S. PATENT DOCUMENTS

| 4,743,786 A | 5/1988 | Ichikawa et al. |
| 5,565,769 A | 10/1996 | Mehnert et al. |
| 6,628,741 B2 | 9/2003 | Netzer |

FOREIGN PATENT DOCUMENTS
WO  WO 2009/031142  3/2009

OTHER PUBLICATIONS

Translation of Office Action Dated Dec. 7, 2011 From the State Intellectual Property Office of the People's Republic of China Re. Application No. 200880114619.8.
International Preliminary Report on Patentability Dated Mar. 18, 2010 From the International Bureau of WIPO Re.: Application No. PCT/IL2008/001190.
International Search Report Dated Apr. 6, 2009 From the International Searching Authority Re.: Application No. PCT/IL2008/001190.
Written Opinion Dated Apr. 6, 2009 From the International Searching Authority Re.: Application No. PCT/IL2008/001190.

*Primary Examiner* — Bot Ledynh

(57) ABSTRACT

Apparatus and method for measuring displacements of a rotary or linearly-displaceable member by counting periods of displacement thereof along a predetermined displacement path, including a pulse generator located at a pulse-generation station proximate to the displacement path; and an electrical circuit controlled by the pulse generator to actuate a first sensor to sense the status of the displaceable member at the particular instant one of said second machine-sensible elements passes through the pulse-generation station, and to increment a counter in accordance with said status determination. In the described preferred embodiments, the second machine-sensible elements are magnetic elements; and the pulse generator includes a coil, a magnetic core magnetically coupled to the coil, and a spring-mounting for the magnetic core causing the core to move from an initial position in one direction with respect to the coil when aligned with one of the second machine-sensible elements, and to be returned in the opposite direction by the spring to its initial position, whereby the coil generates pulses during such movements of the magnetic core.

18 Claims, 4 Drawing Sheets

APPARATUS AND METHOD FOR MEASURING DISPLACEMENTS OF DISPLACEABLE MEMBERS

RELATED APPLICATIONS

This Application is a National Phase of PCT Patent Application No. PCT/IL2008/001190 having International filing date of Sep. 3, 2008, which claims the benefit of U.S. Provisional Patent Application No. 60/935,857 filed on Sep. 4, 2007. The contents of the above Applications are all incorporated herein by reference.

FIELD AND BACKGROUND OF THE INVENTION

The present invention relates to apparatus and methods for measuring displacements of a displaceable member along a predetermined displacement path. The invention is described below particularly with respect to rotary displaceable members such as in rotary encoders, but may also be used with respect to linearly-displaceable members, such as in linear encoders.

The displacement of rotary members is usually measured by counting the number of turns or revolutions experienced by the rotary member as well as fractions thereof, which fractions determine the resolution of the measurement apparatus. Turn counting is needed for example in absolute encoders mounted on motors, e.g., as explained in U.S. Pat. No. 6,628,741 by Netzer.

Turn counting systems are used in rotary encoders to provide absolute position information of high precision even when there is an interruption of the power supply to the system and the shaft to be monitored has been turning during these power supply interruptions. Many absolute encoders use batteries in order to monitor and record the turn counting while external power is interrupted. However the use of battery has a number of drawbacks. Thus, batteries have a limited life time. Moreover, replacing a battery without losing the recorded turn counting requires special circuitry, for example a large capacitor, to back up the recorded data during the battery replacement, which circuitry results in additional cost of the encoder. Further, batteries tolerate a limited range of temperatures, and therefore where the encoders are to be used in high temperature environments, the battery cannot be placed inside the encoder.

U.S. Pat. No. 5,565,769 and U.S. Pat. No. 5,714,882 describe systems that are able to count and register the number of turns of a shaft without a battery; however, these systems are sensitive to vibrations. U.S. Pat. No. 6,628,741B1 describes apparatus to implement a turns counter without a battery by using a reed relay; however reed relays are sensitive to vibrations, have a limited life time, and can be damaged or destroyed in case of high accelerations. Another drawback is that the amount of energy produced in order to count and store the number of turns is very small, which limits the system to the use of ferroelectric memories; unfortunately, these memories are not available in small sizes, and this again limits their application in encoders.

Similar problems are involved in linear encoders for measuring linear displacements of a displaceable member.

OBJECT AND BRIEF SUMMARY OF THE PRESENT INVENTION

An object of the present invention is to provide apparatus, and also a method, for measuring displacements of a displaceable member having advantages in one or more of the above respects.

According to one aspect of the present invention, there is provided apparatus for measuring displacements of a displaceable member along a predetermined displacement path by counting periods of displacement thereof along said predetermined displacement path, said apparatus, comprising:

a first machine-sensible element carried by the displaceable member and occupying a length thereof defining only a portion of a period of displacement of the displaceable member;

a first sensor located at a sensing station proximate to the displacement path so as to be capable of sensing the presence or absence of the first machine-sensible element in the sensing station, and thereby of determining the displacement state of the displaceable member at any particular instant during the displacement of said displaceable member;

a pulse generator located at a pulse-generation station proximate to said displacement path;

a plurality of second machine-sensible elements carried by the displaceable member at spaced intervals along each displacement period of the displacement member, each of the second machine-sensible elements being able to actuate said pulse generator when moving through the pulse-generation station; and an electrical counter for counting the displacement periods of the displaceable member;

said second machine-sensible elements being separate and distinct from said first machine-sensible element and dividing the predetermined displacement path into a plurality of fractions each including one of said second machine-sensible elements;

said apparatus further comprising an electrical circuit controlled by the pulse generator to actuate the first sensor to sense the displacement state of the displaceable member at the particular instant one of said second machine-sensible elements passes through the pulse-generation station, and to increment the counter only when a transition from one displacement state to another is sensed at the instant.

According to further features in the described preferred embodiments, the first and second machine-sensible elements are magnetic elements, and the pulse generator includes a coil, a magnetic core magnetically coupled to the coil, and a spring-mounting for the magnetic core causing the core to move from an initial position in one direction with respect to the coil when aligned with one of the second machine-sensible elements, and to be returned in the opposite direction by the spring to its initial position, whereby the coil generates a pulse during each such movement of the magnetic core. Such a construction obviates the need for a separate battery supply.

Several embodiments are described wherein the displaceable member is a rotary member, and the counter counts the number of periods of rotation and fractions thereof of the rotary member. Another embodiment is described wherein the displaceable member is a linearly-displaceable member, and the counter counts the number of periods of linear displacements and fractions thereof experienced by the displaceable member.

According to another aspect of the present invention, there is provided a method for measuring displacements of a displaceable member along a predetermined displacement path, by counting periods of displacement thereof along said predetermined displacement path, said apparatus comprising:

applying a first machine-sensible element to the displaceable member to occupy a length thereof defining only a portion of a period of displacement of the displaceable member;

providing a first sensor at a sensing station proximate to the displacement path so as to be capable of sensing the presence or absence of the first machine-sensible element in the sensing station, and thereby of determining the status of the displacement state of the displaceable member, at any particular instant during the displacement of the displaceable member;

providing a pulse generator at a pulse-generation station proximate to said displacement path, and an electrical counter controlled by said pulse generator; and applying a plurality of second machine-sensible elements to the displaceable member at spaced intervals along each displacement period of the displacement member, each of the second machine-sensible elements being able to actuate said pulse generator when moving through the pulse-generation station; said second machine-sensible elements being separate and distinct from said first machine-sensible element and dividing the predetermined displacement path into a plurality of fractions each including one of said second machine-sensible elements;

controlling the pulse generator to actuate the first sensor to sense the displacement state of the displaceable member at the particular instant one of the second machine-sensible elements passes through the pulse-generation station, and to increment the electrical counter only when a transition from one displacement state to another is sensed at that instant.

As will be described more particularly below, the apparatus and method of the present invention as briefly described above enable measuring the displacement of a displaceable member in a manner which does not require a battery, which uses standard electronic devices, and which is relatively insensitive to vibrations.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
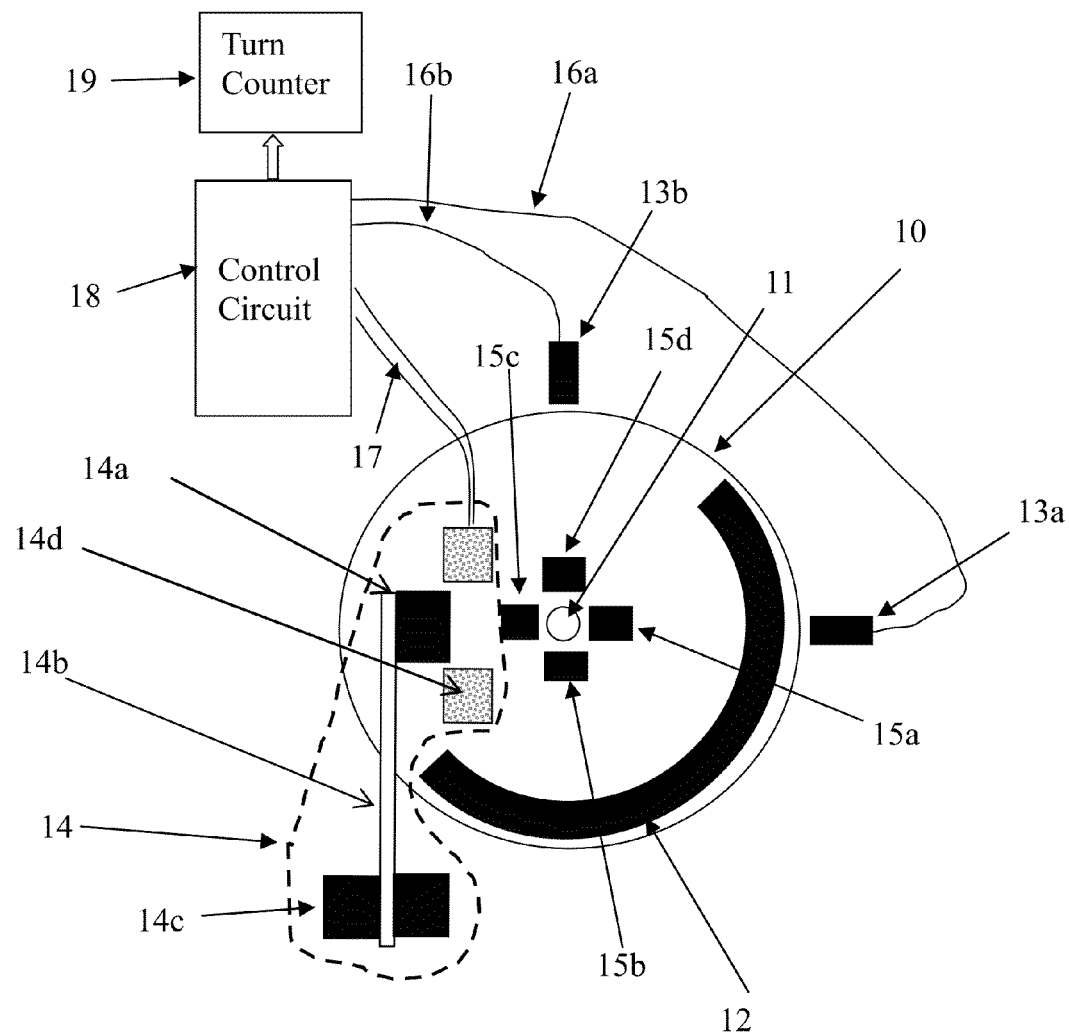
FIG. 1 schematically illustrates one form of apparatus for measuring displacements of a rotary member in accordance with the present invention.

Reference is first made to FIG. 1 schematically illustrating one form of measuring apparatus constructed in accordance with the present invention for measuring the turns or rotations of a shaft 10 about a rotary axis 11. The apparatus illustrated in FIG. 1 may be in the form of a stand-alone turns counter, or a one-turn absolute encoder providing a precise measurement of the rotation angle of the shaft. As will be shown below, the apparatus illustrated in FIG. 1 is designed for recording the number of turns and/or fractions of a turn, without the need for external power, since the required power is received from the rotating shaft by means of magnetic induction.

Thus, as shown in FIG. 1, the rotary shaft 10 itself, whose rotations are to be counted, or a separate disc fixed to that shaft, includes a first machine-sensible element 12 extending around the outer circumference of the shaft for a length defining one-half of a period of displacement (one rotation) of the shaft. Thus, as seen in FIG. 1, machine-sensible element 12 covers one-half the circumference of shaft 10, leaving the other half uncovered. Accordingly, each full rotation or turn of shaft 10 is constituted of a single period, one-half of which is occupied by machine-sensible element 12, whereas the other half is not occupied by that element.

The apparatus illustrated in FIG. 1 further includes at least one sensor, preferably two sensors, 13a, 13b, spaced from each other. Sensors 13a, 13b are located at sensing stations proximate to the displacement path of rotary shaft 10 so as to be capable of sensing the presence or absence of machine-sensible element 12 in the sensing station, and thereby of determining the status of the shaft 10 at any particular instant during the rotation of the shaft. In the described preferred embodiment, machine-sensible element 12 is a magnetic element, and the two sensors 13a, 13b are Hall sensors spaced 90° from each other around the outer surface of shaft 10.

The apparatus illustrated in FIG. 1 further includes a pulse generator, generally designated 14, fixed at another location, called a pulse generation station, proximate to the rotary shaft 10. Pulse generator 14 includes a magnetic core 14a mounted in cantilever fashion at one end of an elastic arm 14b, whose opposite end is fixed at 14c, and is movable with respect to a coil 14d to generate a pulse therein upon each movement of the core with respect to the coil.

Shaft 10 further carries a plurality of second machine-sensible elements 15a-15d equally spaced in a circular array around the axis of rotation 11 of the shaft. In the illustrated example, there are four of such machine-sensible elements 15a-15d; two (15a, 15b) are located in the sector of shaft 10 occupied by the first machine-sensible element 12, and the other two (15c, 15d) are located in the sector of shaft 10 not occupied by machine-sensible element 12. Machine-sensible elements 15a-15d are also magnets, so as to attract magnetic core 14a of pulse generator 14 to generate in coil 14d a pulse each time a magnetic element 15a-15d moves proximately to, and away from, core 14a of the pulse generator.

Each of the two sensors 13a, 13b is connected by leads 16a, 16b, and coil 14d of pulse generator 14 is connected by leads 17, to an electrical control circuit 18, which circuit controls a turns counter 19.

The system illustrated in FIG. 1 operates as follows:

When shaft 10 rotates counter-clockwise, the four magnets 15a-15d also rotate around rotary axis 11, such that each of the four magnets 15a-15d move towards, and then away from, core 14a of pulse generator 14. With each such movement of a magnet 15a-15d with respect to core 14a, the latter core is abruptly moved towards or away from coil 14d, to thereby generate a pulse within the coil with each such movement. These pulses are fed via lead 17 to the electrical control circuit 18. Each such pulse, generated in coil 14d and applied to electrical control circuit 18 via lead 17, activates the electrical circuit for a short period of time during which the electrical circuit enables sensors 13a, 13b to register the rotary position of shaft 10 at that instant. Sensors 13a, 13b thus serve as state sensors, determining the displacement state of the shaft at any particular instant, namely the instant at which electrical circuit 18 receives a pulse from pulse generator 14. Electrical circuit 18 also controls a turns counter 19, which accumulates, in a non-volatile memory, the absolute position of the shaft by counting the number of periods (rotations) and fractions thereof traversed by the shaft.

It will be seen that since magnets 15a-15d are spaced 90° from each other, the rotary position of the shaft can be determined with a resolution of one-quarter of a turn. Also, since there are two displacement state sensors 13a, 13b, located 90° with respect to each other, the measuring system is able to distinguish the direction of the respective increment of rotation, i.e., whether in the forward direction or in the reverse direction.

It will be further seen that a pulse is outputted by the pulse generator 14 each time a magnet 15a-15d moves towards core 14a and then away from the core, and that each such pulse produced in core 14d is not linear, but sharply increases as the magnet moves towards the core, and sharply decreases as the magnet moves away from the core. It will be further seen that these movements of the core will generate energy to activate the turns counter 19. Thus, it is a particular advantage of the illustrated apparatus that the amount of energy available from the pulse generator 14 is large enough to allow the storage of the shaft position in a non-volatile memory, like a ferro-electric memory, a flash memory, or an EPROM.

Figure 2:
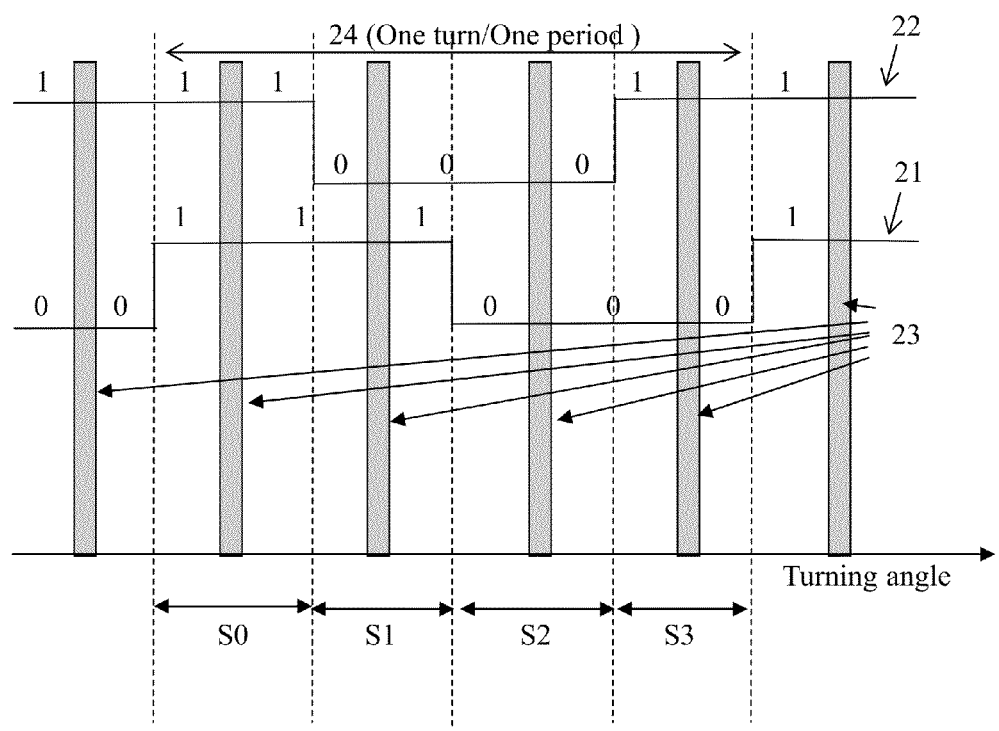
FIG. 2 is a diagram helpful in explaining the operation of the apparatus of FIG. 1.

FIG. 2 illustrates the sequence of states involved in the apparatus illustrated in FIG. 1, wherein one turn to be counted is constituted of one period since there is only one magnet 12 extending for one-half the circumference of the shaft. Following is an Increment Table used to update the number of turns of the shaft in accordance with the sequence of states in FIG. 2.

Increment Table

| Sensor 1 (13a) | Sensor 2 (13b) | Sector | Previous Sector | Position Increment |
|---|---|---|---|---|
| 0 | 0 | s0 | s0 | 0 |
| 0 | 0 | s0 | s1 | −0.25 |
| 0 | 0 | s0 | s2 | n.a. |
| 0 | 0 | s0 | s3 | +0.25 |
| 1 | 0 | s1 | s0 | +0.25 |
| 1 | 0 | s1 | s1 | 0 |
| 1 | 0 | s1 | s2 | −0.25 |
| 1 | 0 | s2 | s3 | n.a. |
| 1 | 1 | s2 | s0 | n.a. |
| 1 | 1 | s2 | s1 | +0.25 |
| 1 | 1 | s2 | s2 | 0 |
| 1 | 1 | s2 | s3 | −0.25 |
| 0 | 1 | s3 | s0 | −0.25 |
| 0 | 1 | s3 | s1 | n.a. |
| 0 | 1 | s3 | s2 | +0.25 |
| 0 | 1 | s3 | s3 | 0 |

Thus, the sequence of the states 21 and 22 of sensor 13a, 13b is shown in FIG. 2 in relation to the rotation angle. The states of each sensor is represented by two values indicating whether the sensor is close to the sensible element or not. Whenever the electronic circuit 18 is activated, then each sensor state is sensed by the electronic circuit.

FIG. 2 also shows, as grey areas 23, the range of angles when the pulse generator 14 outputs pulses to cause the electrical circuit 18 to activate the turns counters 19. A sector can be defined as a range of angles for which the state of sensors 13a, 13b is constant. As shown in FIG. 2, four sector s0-s3 are defined in one turn 24, and the pulse generator outputs one pulse of energy between two transitions of the states 21 or 22.

As explained above, the electric circuit 18 and turns counter 19 are activated at least once each time shaft 10 moves at least one quarter of a turn, such that there will always be at least one update of the position measurement for each one quarter of a turn. In the preferred embodiment, Hall sensors are used because they provide sensing with minimum power consumption. However, other types of sensors can be used, such as reed relays, proximity sensors, or other types of sensors.

It will also be appreciated that in the described preferred embodiment of FIGS. 1 and 2, as well as in the other embodiments described below, the machine-sensible elements 12 and 15a-15d are magnetic elements which generate the required electricity and therefore do not need a battery. However, in some applications where a battery can be used, such elements could be optical elements, rather than magnetic elements, whereupon the status sensors 13a, 13b, as well the pulse generator 14, would be optically activated rather than magnetically activated.

In addition, whereas in the preferred embodiment illustrated in FIGS. 1 and 2, two status sensors 13a, 13b are used, so that the rotation of the shaft in both directions can be registered, there may be applications where the shaft is susceptible of moving only in one direction, in which case only one displacement state sensor would be needed to count half-turns.

In addition, sectors in the preferred embodiment are shown covering a 90 degrees range of angle; however sectors can be of different sizes, so long as that there is at least one activation of the pulse generator in the range of each sensor.

A particular advantage of the apparatus illustrated is that it does not count the number of pulses outputted by the pulse generator, but rather such pulses are used to provide energy to a separate turns counter 19. As a result, the described system is not sensitive to vibrations. If vibrations occur, and these vibrations result in a movement of the moving core 14a of the pulse generator 14, and a pulse of energy is outputted more than once in a quarter of a turn, then the increment by one quarter of a turn will be done only for the first pulse; the following pulse will result in a zero increment value. This is clearly shown in the above Increment Table, wherein the position increment is given as a function of the present states of the sensors and the previous states as sensed by the electronic circuit 18 and the turns counter 19. Whenever activated, the electronic circuit 18 checks, at a high rate, the states of the sensors, and updates the shaft position according to the table. The checking cycle is short enough so that the shaft position will be updated even if the shaft has a high rotational speed.

Also in the above Increment Table, a sector is defined as a range of angles for which the state of sensors 13a and 13b remains constant.

It must be understood that the preferred embodiment illustrated shows sectors of exactly one quarter of a turn; however the sectors may be of different sizes, as long as there is at least one activation of the pulse generator within one sector, i.e. at least one of the second sensible member activates the pulse generator within the sector range.

Another advantage of the illustrated apparatus is that the turn counting resolution is one-fourth of a turn, i.e., one-fourth of a period, using only two sensors. Another advantage of the illustrated apparatus is that only one magnetic energy generating element, i.e., pulse generator 14, is used for a bi-directional turn counter. This is to be sharply distinguished from the systems illustrated in the above-cited US patents, which need at least three magnetic energy generating elements in order to count in both directions.

In the embodiment illustrated in FIGS. 1 and 2, the apparatus is used to count the number of turns of a shaft, each turn representing a period of displacement, with one-quarter of a turn resolution. It will be appreciated that the same apparatus can include a counting system having a different resolution than one-quarter turn by providing a different number of magnets 12 (or other machine-sensible elements), to thereby define a different number of sectors of the shaft to produce at least one pulse of energy per sector.

Figure 3:
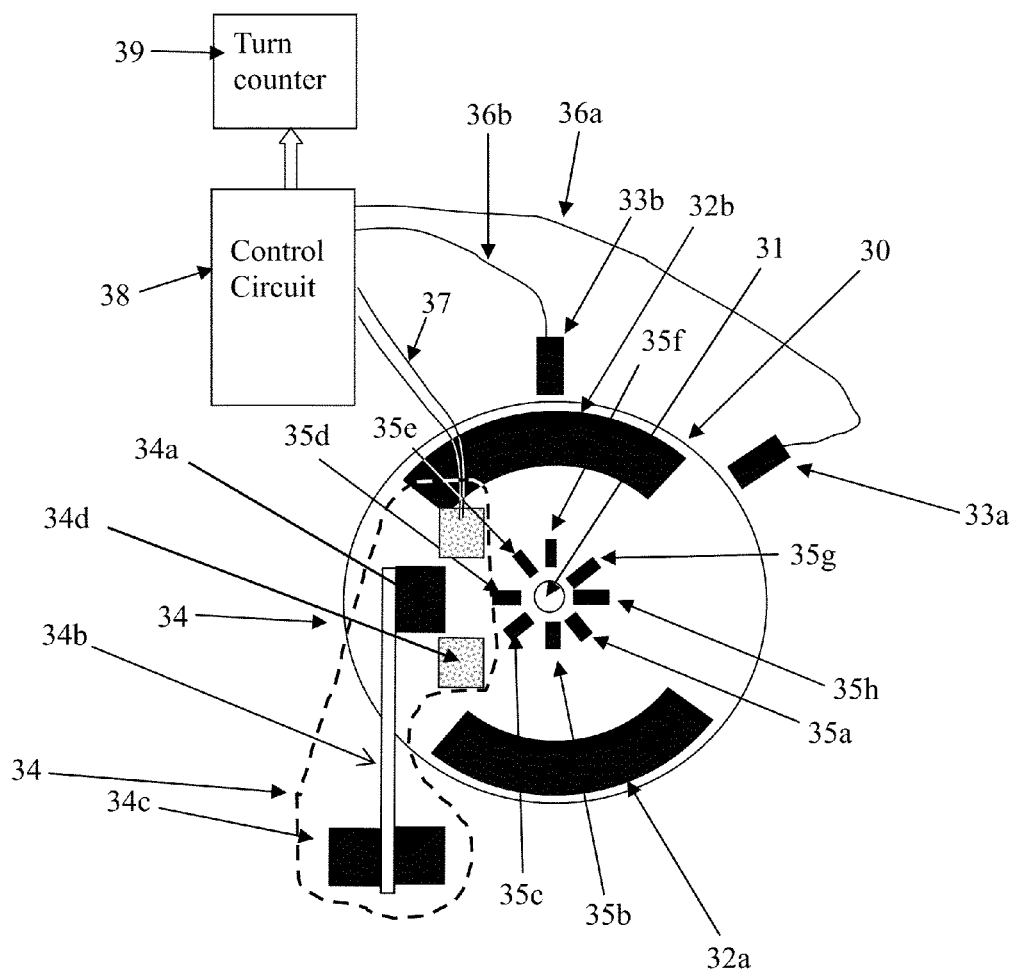
FIG. 3 schematically illustrates another apparatus for measuring displacements of a rotary shaft in accordance with the present invention providing higher resolution than the apparatus of FIG. 1.

FIG. 3 illustrates an apparatus wherein the shaft 30 is divided into eight sectors by eight magnets 35a-35h equally arranged in a circular array around the rotary axis 31 of the shaft. In the apparatus illustrated in FIG. 3, there are two outer magnets 32a, 32b each extending for one-half the circumference of the rotary shaft, so as to define two periods to be counted, for each rotation, with each period divided into four sectors defined by the state of two displacement state sensors 33a, 33b, each being at one-fourth of a period, i.e., one-eighth of an angular turn. For each sector range, an inner magnet (35a-35d) is positioned to activate the pulse sensor.

The remainder of the system illustrated in FIG. 3 is constructed and operates in substantially the same manner as described above with respect to FIGS. 1 and 2. Thus, the apparatus illustrated in FIG. 3 includes a pulse generator, generally designated 34, including a movable core 34a secured to one end of an elastic member 34b whose opposite end 34c is fixed, and movable within a coil 34d when each of the inner magnets 35a-35h passes into and out of alignment with the magnetic core 34a. The pulses generated by coil 34d are applied to electrical circuit 38 via leads 37; and the status of each of the status sensors 33a, 33b, with respect to the outer magnets 32a, 32b, is fed to electrical circuit 38 via leads 36a and 36b from the two status sensors 33a, 33b. Electrical circuit 38 thus increments (or decrements) turns counter 39 according to the sensed displacement state, as described above with respect to FIGS. 1 and 2.

It will thus be seen that the apparatus illustrated in FIG. 3 has a resolution of one-eighth of a turn, rather than one-quarter of a turn as in FIGS. 1 and 2.

It will be appreciated that a displacement measuring system constructed in accordance with the present invention may be based on more than one or two periods for each turn by providing the rotary shaft with the appropriate number of outer magnets (12), namely one for each such period and extending for one-half the distance of the respective period. It will also be appreciated that the apparatus may be constructed to provide a different number of sectors, and thereby a different resolution, by providing the appropriate number of inner magnets to actuate the pulse generator at least once for each sector during each rotation.

Figure 4:
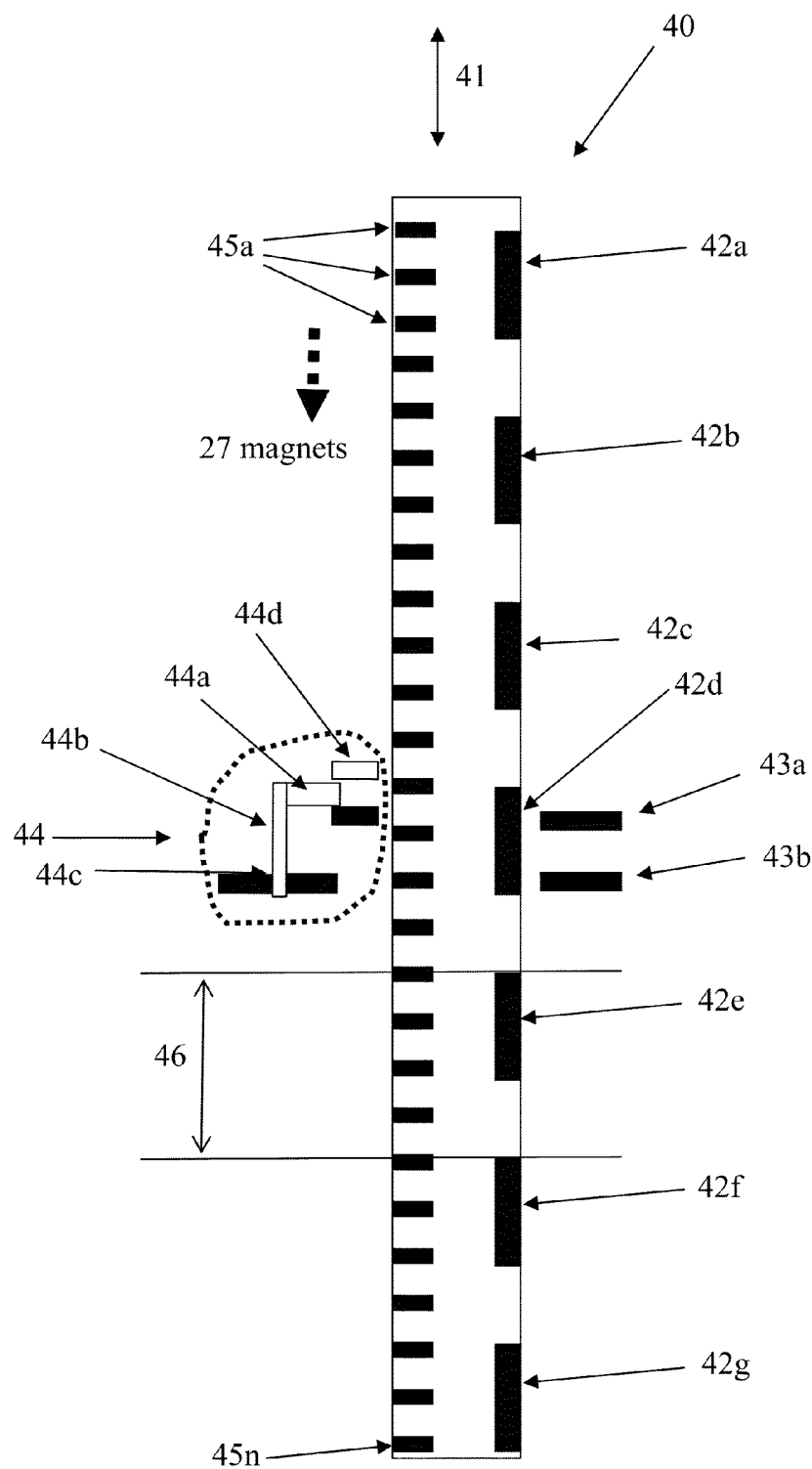
FIG. 4 schematically illustrates one form of apparatus for measuring displacements of a linear displaceable member in accordance with the present invention.

FIG. 4 schematically illustrates the invention implemented in apparatus for measuring linear displacements in the form of linear displacement periods and fractions thereof along a linear displacement path, rather than rotary displacements as in FIGS. 1-3. Thus, the apparatus illustrated in FIG. 4 includes a linearly-displaceable member, generally designated 40, displaceable in a linear path as indicated by arrow 41. Displaceable member 40 includes, on one side, a plurality of machine-sensible elements, namely magnets 42a-42g, one for each period of displacement of member 40, with each such magnet covering one-half the period. The respective side of displaceable member 40 further includes two displacement state sensors 43a, 43b.

The opposite side of displaceable member 40 is provided with a pulse generator 44 including a movable core 44a carried at one end of an elastic arm 44b, with the opposite end of the elastic arm 44c fixedly mounted, and with the core 44a movable with respect to a coil 44d to generate an electrical pulse with each movement of the coil. In this case, however, pulse generator 44 is actuated by a plurality of magnets 45a-45n, corresponding to the number of periods defined by magnets 42a-42g and the resolution desired in the measuring apparatus. In the example illustrated in FIG. 4, magnets 42a-42g divide the length of the displaceable member into seven periods 46, and the magnets 45a-45n divide each period 46 into four fractions, such that the measuring apparatus has a resolution of one-fourth period.

The apparatus illustrated in FIG. 4 is otherwise constructed and operates in the same manner as described above with respect to FIGS. 1-3, to measure the linear displacement of member 40 in terms of periods 46, with a resolution of one-fourth period. It will be appreciated that the distance of each period 46 is precisely known, so that the apparatus illustrated in FIG. 4 measures displacement in terms of absolute values of displacement.

While the invention has been described with respect to several preferred embodiments, it will be appreciated that many variations may be made. For example, one or both of the types of machine-sensible elements could be optical elements or capacitive-type elements, rather than magnetic elements, and the pulse generator could be an optically-actuated one, rather than a magnetically-actuated one. In addition, the resolution of the measuring apparatus could be increased (or decreased) providing the appropriate number of magnets for actuating the pulse generator, and the appropriate spacing of the status sensors cooperable with the status magnets.

Many other variations, modifications and applications of the invention will be apparent.

What is claimed is:

1. Apparatus for measuring displacements of a rotary displaceable member along a predetermined displacement path by counting periods of displacement thereof along said predetermined displacement path, said apparatus comprising:

a first machine-sensible element carried by said displaceable member and occupying a length thereof defining only a portion of a period of displacement of the displaceable member;

a first sensor located at a sensing station proximate to said displacement path so as to be capable of sensing the presence or absence of said first machine-sensible element in the sensing station, and thereby of determining the displacement state of the displaceable member at any particular instant during the displacement of said displaceable member;

a pulse generator located at a pulse-generation station proximate to said displacement path;

a plurality of second machine-sensible elements carried by said displaceable member at spaced intervals along each displacement period of the displacement member, each of said second machine-sensible elements being able to actuate said pulse generator when moving through said pulse-generation station; and an electrical counter for counting the displacement periods of the displaceable member;

said second machine-sensible elements being closer to the center of said displaceable member than said first machine-sensible element and dividing the predetermined displacement path into a plurality of fractions each including one of said second machine-sensible elements;

said apparatus further comprising an electrical circuit controlled by said pulse generator to actuate said first sensor to sense the displacement state of the displaceable member at the particular instant one of said second machine-sensible elements passes through said pulse-generation station, and to increment the counter only when a transition from one displacement state to another is sensed at that instant.

2. The apparatus according to claim 1, wherein said first machine-sensible element is a magnetic element.

3. The apparatus according to claim 1, wherein said second machine-sensible elements are magnetic elements.

4. The apparatus according to claim 3, wherein said pulse generator includes a coil, a magnetic core magnetically coupled to said coil, and a spring-mounting for said magnetic core causing said core to move from an initial position in one direction with respect to said coil when aligned with one of said second machine-sensible elements, and to be returned in the opposite direction by said spring to its initial position, whereby the coil generates pulses during such movements of the magnetic core.

5. The apparatus according to claim 4, wherein said displaceable member is displaceable bi-directionally, and said apparatus comprises two of said first sensors spaced from each other along said displacement path such as to enable the measuring system to distinguish reverse-direction displacements from forward-direction displacements.

6. The apparatus according to claim 5, wherein said electrical circuit increments said electrical counter for each sensed forward-direction displacement, and decrements said electrical counter for each sensed reverse-direction displacement.

7. The apparatus according to claim 4, wherein said displaceable member carries at least four equally-spaced second machine-sensible elements for each displacement period.

8. The apparatus according to claim 4, wherein said displacement member carries at least eight equally-spaced second machine-sensible elements for each displacement period.

9. The apparatus according to claim 4, wherein said counter counts the number of periods of rotation and fractions thereof of said rotary member.

10. The apparatus according to claim 9, wherein said first machine-sensible element is located on the outer peripheral surface of said rotary member, and said second machine-sensible elements are located in a circular array around the axis of rotation of said rotary member.

11. Method for measuring displacements of a rotary displaceable member along a predetermined displacement path by counting periods of displacement thereof along said predetermined displacement path, said method comprising:
applying a first machine-sensible element to said displaceable member to occupy a length thereof defining only a portion of a period of displacement of the displaceable member;
providing a first sensor at a sensing station proximate to said displacement path so as to be capable of sensing the presence or absence of said first machine-sensible element in the sensing station, and thereby of determining the displacement state of the displaceable member, at any particular instant during the displacement of said displaceable member;
providing a pulse generator at a pulse-generation station proximate to said displacement path, and an electrical counter controlled by said pulse generator; and
applying a plurality of second machine-sensible elements to said displaceable member at spaced intervals along each displacement period of the displacement member, each of said second machine-sensible elements being able to actuate said pulse generator when moving through said pulse-generation station; said second machine-sensible elements being closer to the center of said displaceable member than said first machine-sensible element and dividing the predetermined displacement path into a plurality of fractions each including one of said second machine-sensible elements;
controlling said pulse generator to actuate said first sensor to sense the displacement state of the displaceable member at the particular instant one of the second machine-sensible elements passes through said pulse-generation station, and to increment the electrical counter only when a transition from one displacement state to another is sensed at that instant.

12. The method according to claim 11, wherein said first machine-sensible element is a magnetic element.

13. The method according to claim 11, wherein said second machine-sensible elements are magnetic elements.

14. The method according to claim 13, wherein said pulse generator includes a coil, a magnetic core magnetically coupled to said coil, and a spring-mounting for said magnetic core causing said core to move from an initial position in one direction with respect to said coil when aligned with one of said second machine-sensible elements, and to be returned in the opposite direction by said spring to its initial position, whereby the coil generates pulses during such movements of the magnetic core.

15. The method according to claim 14, wherein said displaceable member is displaceable bi-directionally, and there are two of said first sensors spaced apart from each other along the displaceable member such as to enable the measuring system to distinguish reverse-direction displacements from forward-direction displacements.

16. The method according to claim 15, wherein said electrical counter is incremented for each sensed forward-direction displacement, and decremented for each sensed reverse-direction displacement.

17. The method according to claim 14, wherein said displaceable member carries at least four equally-spaced second machine-sensible elements for each displacement period.

18. The method according to claim 14, wherein said displacement member carries at least eight equally-spaced second machine-sensible elements for each displacement period.

* * * * *